United States Patent [19]
Tada et al.

[11] Patent Number: 5,860,030
[45] Date of Patent: Jan. 12, 1999

[54] LENS BARREL

[75] Inventors: Kanehiro Tada, Tokyo; Ryuzo Ohta, Chiba, both of Japan

[73] Assignee: Sony Corporation, Japan

[21] Appl. No.: 521,407

[22] Filed: Aug. 30, 1995

[30] Foreign Application Priority Data

Sep. 22, 1994 [JP] Japan .................................. 6-252790
Sep. 26, 1994 [JP] Japan .................................. 6-256266

[51] Int. Cl.⁶ ................................................ G03B 17/00
[52] U.S. Cl. ................................ 396/72; 396/75; 396/79
[58] Field of Search ............................ 396/72, 75, 79, 396/348, 349, 462; 359/676, 694, 696, 704

[56] References Cited

U.S. PATENT DOCUMENTS

| | | | |
|---|---|---|---|
| 4,721,972 | 1/1988 | Wakabayashi | 396/349 |
| 4,843,411 | 6/1989 | Wakabayashi et al. | 396/349 |
| 4,993,815 | 2/1991 | Yamazaki et al. | 396/72 |
| 5,153,626 | 10/1992 | Yamamoto | 396/349 |
| 5,212,509 | 5/1993 | Kosako et al. | 396/29 |
| 5,287,223 | 2/1994 | Hirasawa | 396/135 |

*Primary Examiner*—Eddie C. Lee
*Attorney, Agent, or Firm*—Ronald P. Kananen

[57] ABSTRACT

In a new retractable lens barrel of a type wherein a movable barrel is mounted protrudably in an optical axis direction from a fixed barrel or a camera body and filming is possible when the movable barrel is in a protruded state and comprising a movable lens of a variable power and/or focusing system, a space formed when the movable barrel is protruded from the fixed barrel or camera body is made a space in which the movable lens is movable during filming and the casing of the iris unit and a lens holder of a fixed lens are formed integrally. Because the space in which the movable lens is movable during filming is used to accommodate the movable barrel when the camera is not being used and the movable barrel is retracted, the length of the retracted lens barrel in the front-rear direction can be made short. Also, because the casing of the iris unit and the lens holder of a fixed lens are formed integrally, the number of parts is reduced and the optical axes of different lens groups and the iris unit are not readily misaligned when the lens barrel is being assembled.

10 Claims, 18 Drawing Sheets

LENS BARREL

BACKGROUND OF THE INVENTION

1. Field of the Invention

This invention relates to a retractable lens barrel wherein a movable barrel is protrudable from a fixed barrel or a camera body. More particularly, the invention provides a new lens barrel which can be made compact even when it contains movable lenses of a variable power system and/or a focusing system; the length of which in the front-rear (axial) direction can be reduced; the number of parts reduced; and the optical axes of different lens groups and an iris unit of which do not readily become misaligned when the lens barrel case is being assembled.

2. Description of the Prior Art

Retractable-type lens barrels wherein a movable barrel is protrudable from a fixed barrel or a camera body to improve the portability of the camera are known.

FIG. 1 and FIG. 2 are schematic views of an example of such a known lens barrel which is retractable into a camera body.

Referring to FIG. 1 and FIG. 2, a lens barrel 1a is mounted movably in its optical axis direction with respect to a camera body 1b; during filming, the lens barrel 1a projects forward from the camera body 1b and is in a filming-possible state (see FIG. 1). When the camera is not being used the lens barrel 1a is retracted into the camera body 1b and is in a filming-impossible state (see FIG. 2).

A zoom lens 1c is mounted in a lens holder 1d and the lens holder 1d is mounted movably with respect to the lens barrel 1a; the zoom lens 1c is moved inside the camera body 1b in the optical axis direction and zooming is thereby effected by a drive mechanism not shown in the drawings.

By the lens barrel 1a being contracted, most of the lens barrel 1a can be received into the camera body 1b and the whole camera when not in use can be made compact.

However, in the lens barrel 1a described above, because the zoom lens 1c is mounted inside the lens barrel 1a movably with respect thereto, a space 1e for this lens barrel 1a to be retracted into must be provided inside the camera body 1b, and there has been the problem that the size of the whole camera consequently becomes large.

The space 1e formed inside the camera body 1b for the lens barrel 1a to be retracted into becomes wasted space when the lens barrel 1a has been protruded, and because besides this space 1e a space 1f for a focusing lens and an iris mechanism and the like to be disposed in is necessary in the camera body 1b, the size of the camera body 1b in the optical axis direction has been large.

Also, for example in the design of a lens barrel of a high variable power rate, it is necessary for the range of movement of the zoom lens 1c to be made large, and in this case the space 1e in which the zoom lens 1c can move in the camera body 1b must be made large, the lens barrel 1a itself must be made large in the optical axis direction, and when the large lens barrel 1a is all to be retracted into the camera body 1b, the camera body 1b has had to be made large.

FIG. 3 and FIG. 4 on the other hand, show an example of a conventional camera lens barrel 2a wherein a case 2b comprises a cylindrical front half 2c and a cylindrical rear half 2d slightly smaller than the front half 2c joined together one in front of the other (the left side of FIG. 5 will be taken as the front and the right side as the rear).

A first lens group 2e is a positive lens group, a second lens group 2f is a negative lens group, a third lens group 2g is a positive lens group and a fourth lens group 2h is also a positive lens group.

The four lens groups 2e, 2f, 2g and 2h are arrayed in the above order on a common optical axis x—x extending in the front-rear direction through the center of the case 2b as seen in the front-rear direction.

An iris unit 2i comprising a casing 2j containing diaphragm vanes 2k, 2k for light quantity control is mounted on the rear end of the front half 2c of the case 2b.

The first lens group 2e is fixed by suitable means to the front end of the front half 2c of the case 2b and the front of the case 2b is thereby closed off.

A slidable lens holder 21 is slidably mounted on slide shafts 2m, 2m mounted on the upper and lower sides of the front half 2c of the case 2b, and the second lens group 2f is mounted in the slidable lens holder 21 and constitutes a zooming lens.

A fixed lens holder 2n holding the third lens group 2g is mounted by suitable means on the rear surface of the casing 2j of the iris unit 2i.

A sliding lens holder 2o is slidably mounted on slide shafts 2p, 2p mounted on the upper and lower sides of the rear half 2d of the case 2b, and the fourth lens group 2h is mounted in the sliding lens holder 2o and constitutes a focusing lens.

A low pass filter 2q is mounted behind the fourth lens group 2h.

The double-dot broken line 2r in FIG. 4 indicates the diaphragm central position of the diaphragm vanes 2k, 2k, and this line serves as a reference for setting the distance between the diaphragm and the third lens group 2g.

With the conventional camera lens barrel 2a, because making the four lens groups 2e, 2f, 2g and 2h thinner than they are at present is very difficult due to problems of refraction and the like, and because it is not possible to make the movement spaces of the second lens group 2f and the fourth group 2h smaller, it has not been possible to shorten the front-rear direction length of the case 2b.

Also, because the case 2b is made by joining together four parts comprising the front half 2c, the iris unit 2i, the fixed lens holder 2n and the rear half 2d, when even slight deviations occur during assembly, these slight deviations add up to a large deviation. Thus, it has been extremely difficult to align the optical axes of the four lens groups 2e, 2f, 2g and 2h and the center of the iris unit 2i on the optical axis x—x.

There has also been the problem that even when the fixed lens holder 2n and the iris unit 2i are made in conformity with their design, if deviation arises when the fixed lens holder 2n is mounted on the rear surface of the casing 2j of the iris unit 2i, the distance between the diaphragm center position 2r of the diaphragm vanes 2k, 2k and the third lens group 2g becomes incorrect.

OBJECT AND SUMMARY OF THE INVENTION

An object of this invention is to make a whole camera compact by making it unnecessary to provide a space for a movable lens to move in and not making a fixed barrel or a camera body unnecessarily large in the optical axis direction.

Another object of the invention is to provide a lens barrel of which the length of the case in the front-rear direction can be made short and the number of parts can be reduced and the lens groups and iris unit of which can be easily aligned on the optical axis.

A further object of the invention is to provide a lens barrel of which the distance between the diaphragm central position of the iris unit and the third lens group can be easily set.

To achieve the above objects and other objects, the invention provides a retractable lens barrel wherein a movable barrel is mounted protrudably in an optical axis direction from a fixed barrel or a camera body and filming is possible when the movable barrel is in a protruded state, the lens barrel comprising a movable lens of a variable power and/or focusing system, wherein a space formed when the movable barrel is protruded from the fixed barrel or camera body is made a space in which the movable lens is movable.

Preferably, four lens groups constitute a lens system housed in the lens barrel and are arrayed in the following order from the object side: a positive lens group, a negative lens group, and a positive lens group, a positive lens group.

Preferably, the second lens group is a variable power system movable lens group and the fourth lens group is a focusing system lens group.

Preferably, the action of protruding the movable barrel from the fixed barrel and the action of moving the variable power system movable lens are carried out by linear motors.

The invention also provides a lens barrel for a camera having a lens system made up of a plurality of lens groups and an iris unit disposed in the lens system, wherein the casing of the iris unit and a lens holder of a fixed lens, which is one of the lens groups, are formed integrally.

Preferably, four lens groups constitute the lens system and are arrayed in the following order from the object side: a positive lens group, a negative lens group, a positive lens group, and a positive lens group.

Preferably, the four lens groups constituting a lens system are arrayed in the following order from the object side: a fixed lens group, a movable lens group, a fixed lens group, and a movable lens group; the iris unit is disposed between the movable lens group and the fixed lens group that are the second and third lens groups from the object side; and the fixed lens group that is the third lens group from the object side is held in a lens holder formed integrally with the casing of the iris unit.

DETAILED DESCRIPTION OF THE PREFERRED EMBODIMENTS

Figure 1:
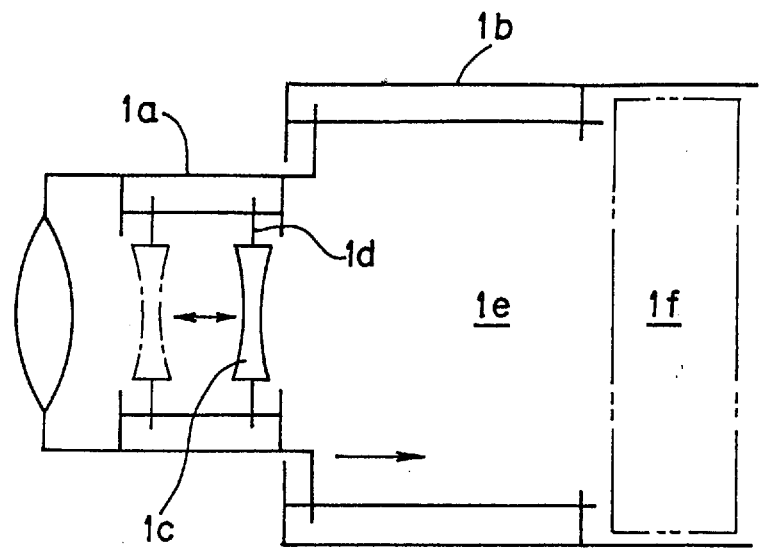
FIG. 1 is a schematic sectional view of an example of a conventional lens barrel in a ready-for-filming state.
Figure 2:
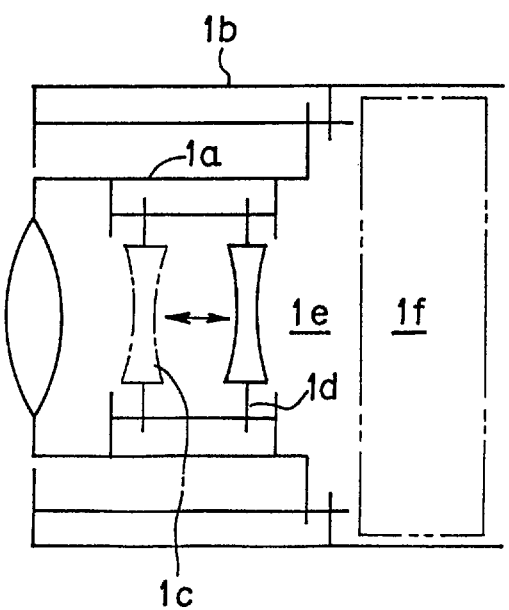
FIG. 2 is a sectional view of the conventional lens barrel in a retracted state.
Figure 3:
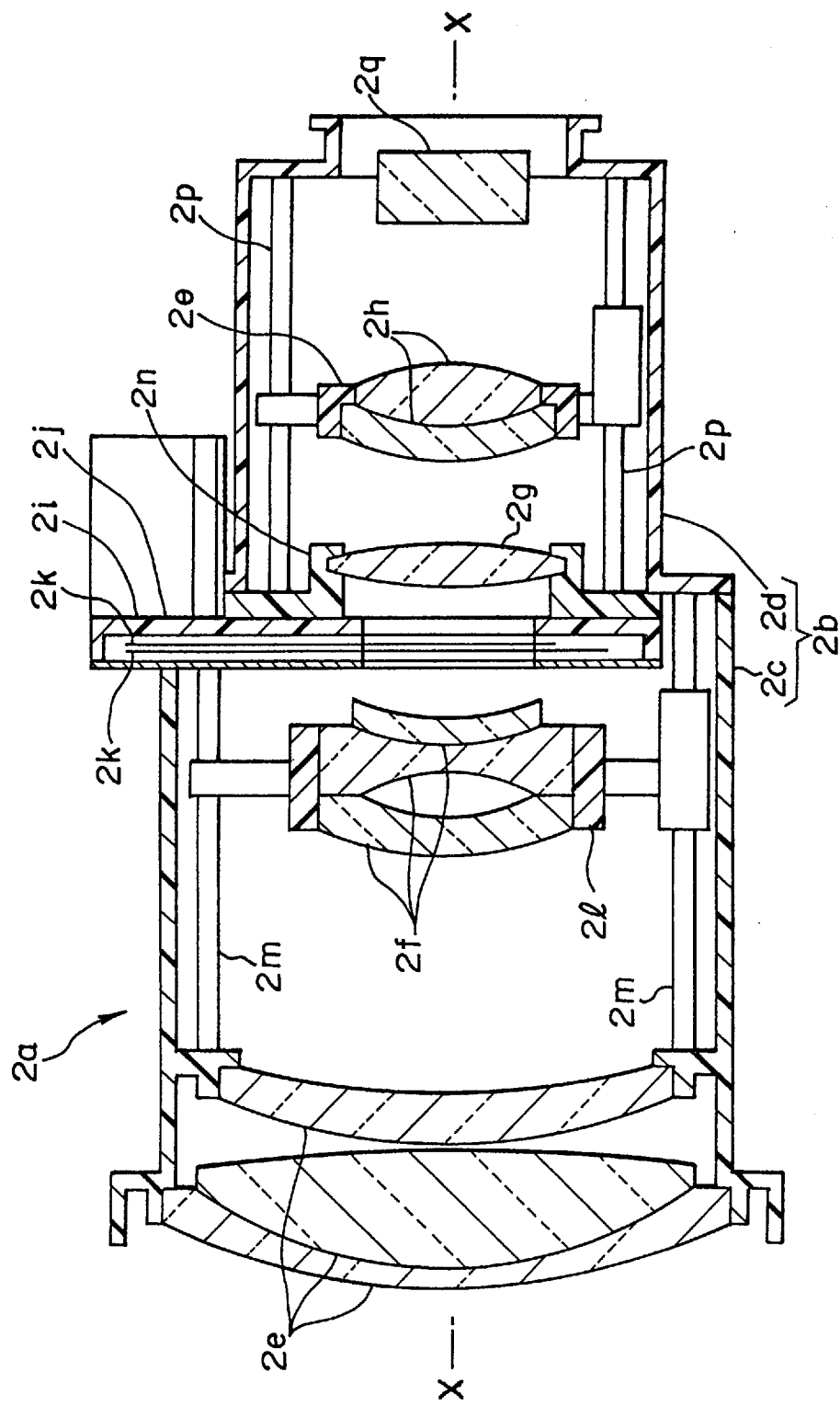
FIG. 3 is a vertical sectional view of an example of a conventional lens barrel.
Figure 4:
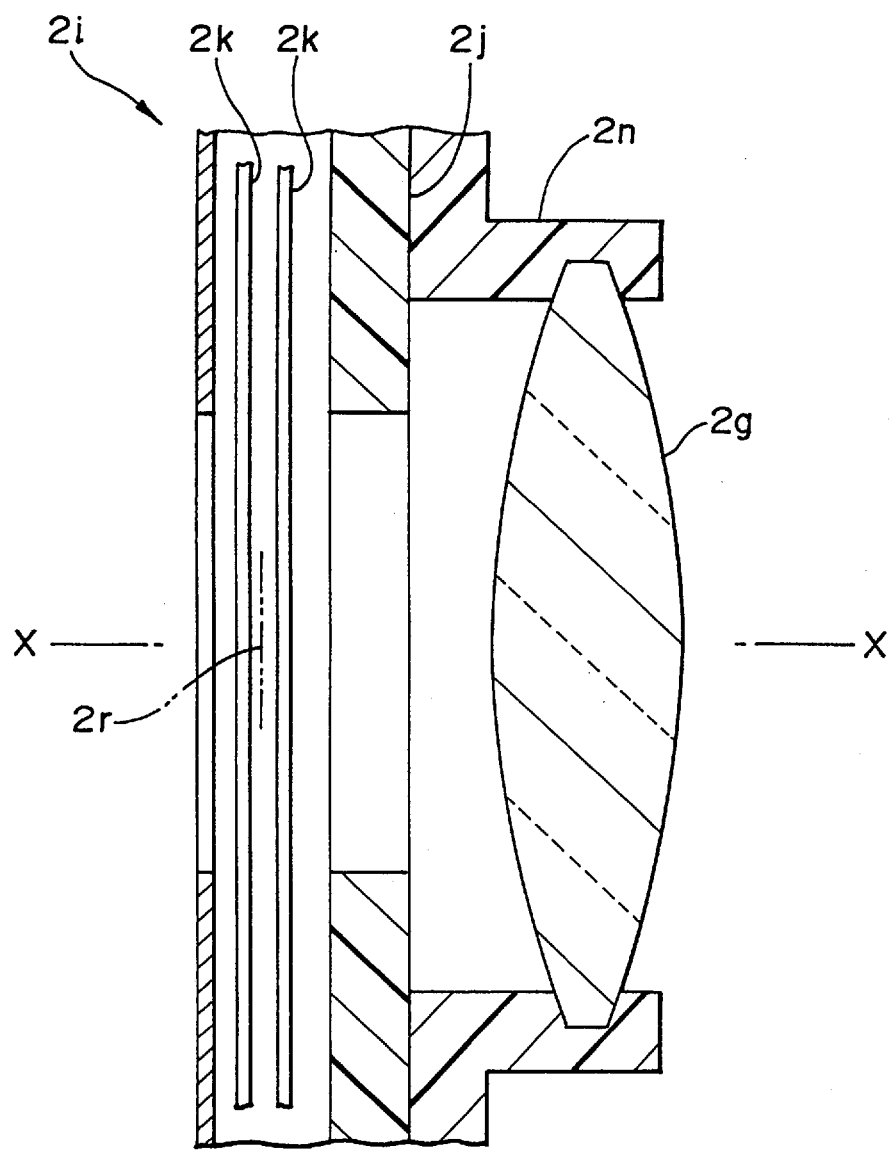
FIG. 4 is an enlarged sectional detail view of the conventional lens barrel shown in FIG. 3.

Preferred embodiments of the invention will now be described with reference to the accompanying drawings.

(1) First Preferred Embodiment

FIG. 5 through FIG. 17 show a lens barrel for a video camera according to a first preferred embodiment of the invention.

Reference numeral 1 denotes a lens barrel of a video camera; a first lens group 2, a second lens group 3, an iris mechanism 4, a third lens group 5 and a fourth lens group 6 are disposed in the lens barrel 1 in this order from the front thereof; the first lens group 2 and the third lens group 5 are fixed lenses, and the second lens group 3 and the fourth lens group 6 are movable lenses. (Fixed lenses are lenses which do not move when the lens barrel 1 is in the ready-for-filming state, and movable lenses are lenses which move during filming.

Figure 6:
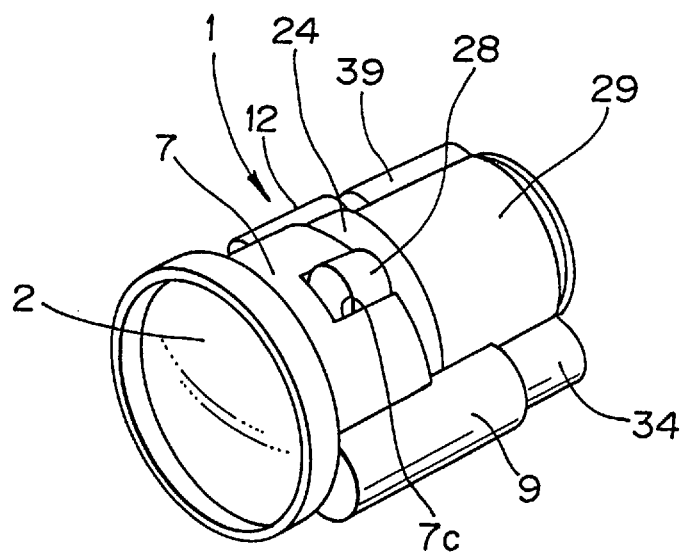
FIG. 6 is a perspective view of the same lens barrel in a retracted state.

A cylindrical movable barrel 7 which holds the first lens group 2 in the front end opening of the lens barrel so that the first lens group 2 closes off the opening is mounted movably with respect to a fixed barrel as will be further discussed later; when the movable barrel 7 has been protruded from the fixed barrel (the ready-for-filming state) filming is possible (see FIG. 1), and when the movable barrel 7 has been retracted into the fixed barrel (the retracted state) filming is not possible (see FIG. 6).

Figure 5:
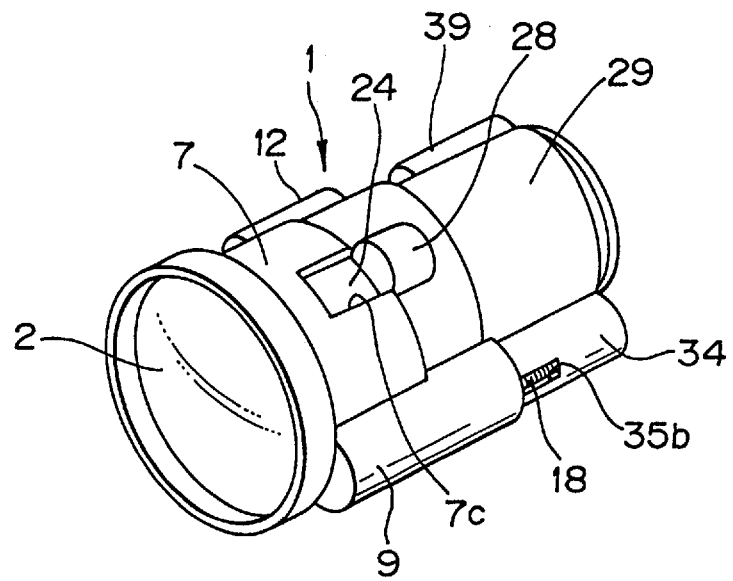
FIG. 5 is a perspective view of an example of a lens barrel according to a first preferred embodiment of the invention as applied to a retractable lens barrel of a video camera, the lens barrel being shown in a ready-for-filming state.

The part of the lens barrel at the lower-left in FIG. 5 will be called the front, the part at the upper-right the rear, the part at the upper-left the right side and the part at the lower-right the left side; the upper part of the lens barrel in FIG. 5 will be called the upper side and the lower part the lower side. These directions will be used throughout the following description.

Figure 9:
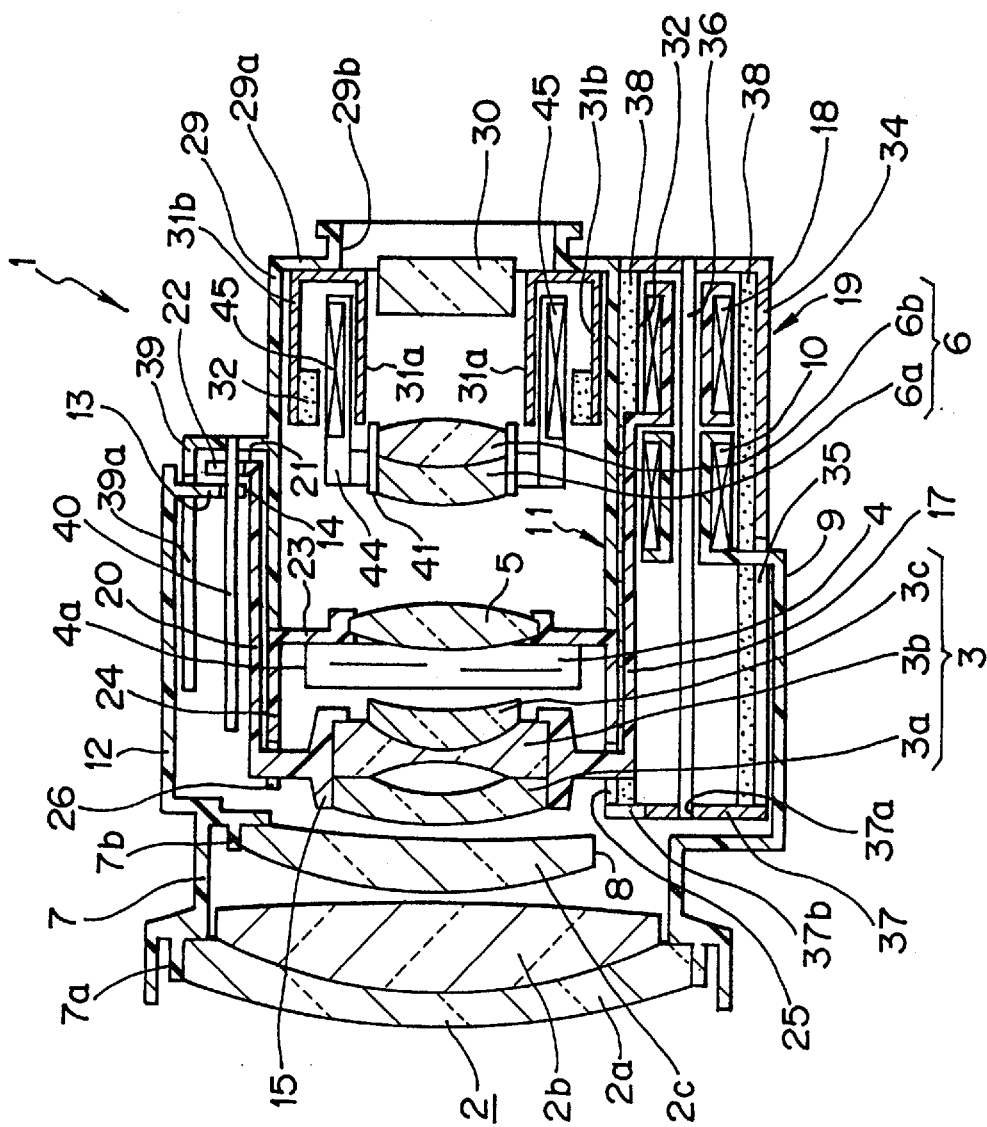
FIG. 9 is a sectional view taken along the section line V—V in FIG. 8 showing the retracted state.
Figure 10:
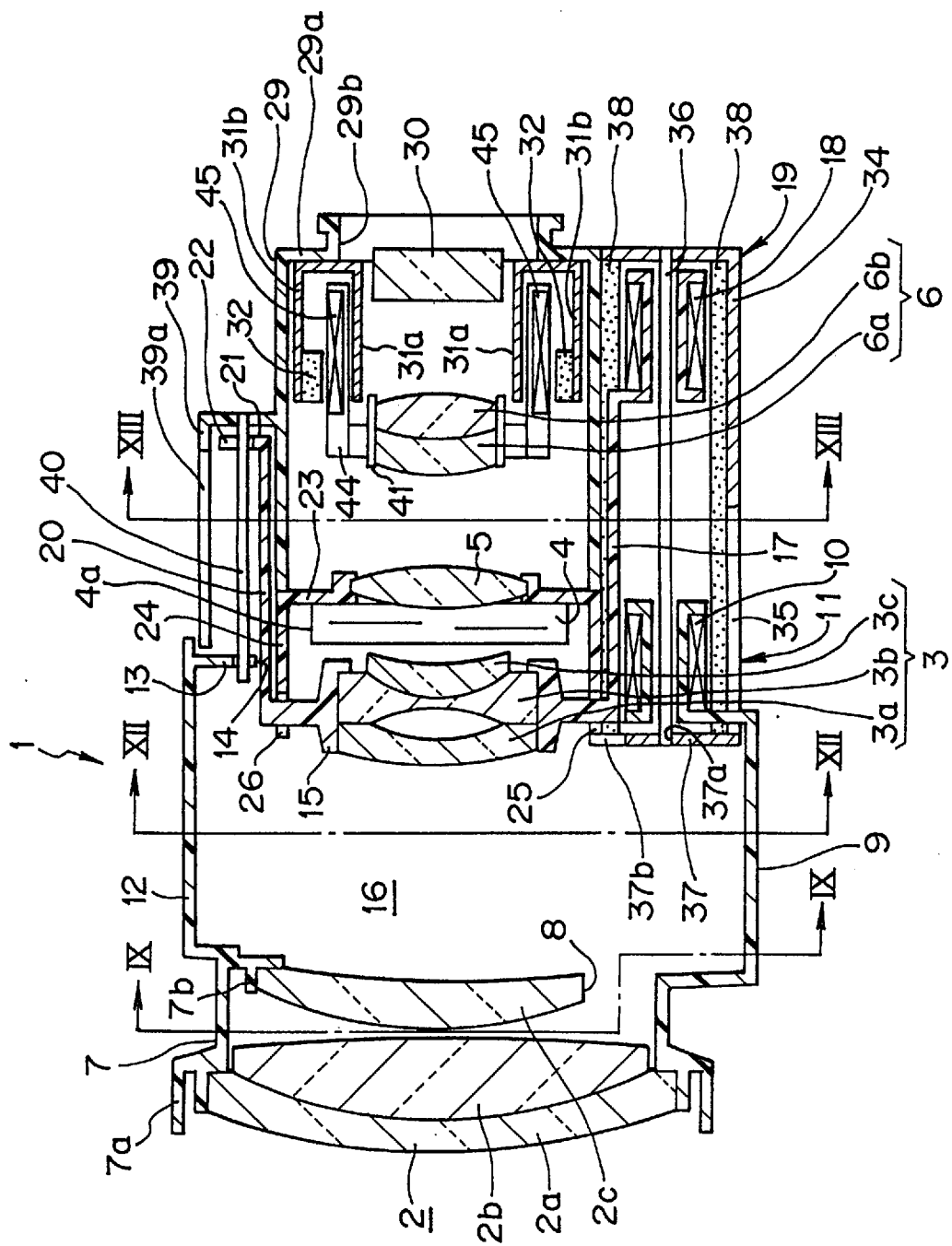
FIG. 10 is a sectional view taken along section line VI—VI in FIG. 8 showing the maximum telephoto ready-for-filming state.
Figure 11:
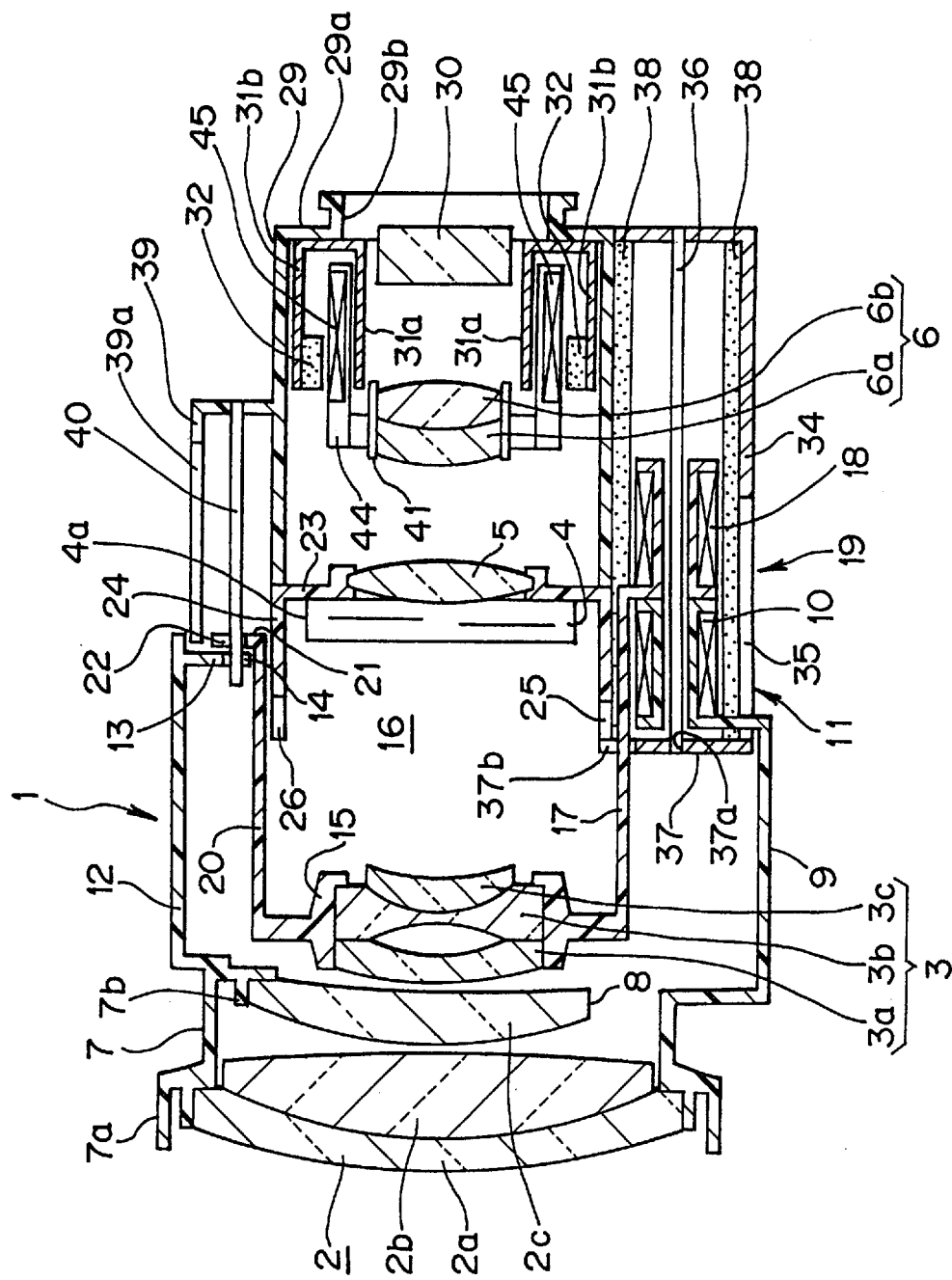
FIG. 11 is a sectional view taken along section line VII—VII in FIG. 8 showing the maximum wide-angle ready-for-filming state.
Figure 12:
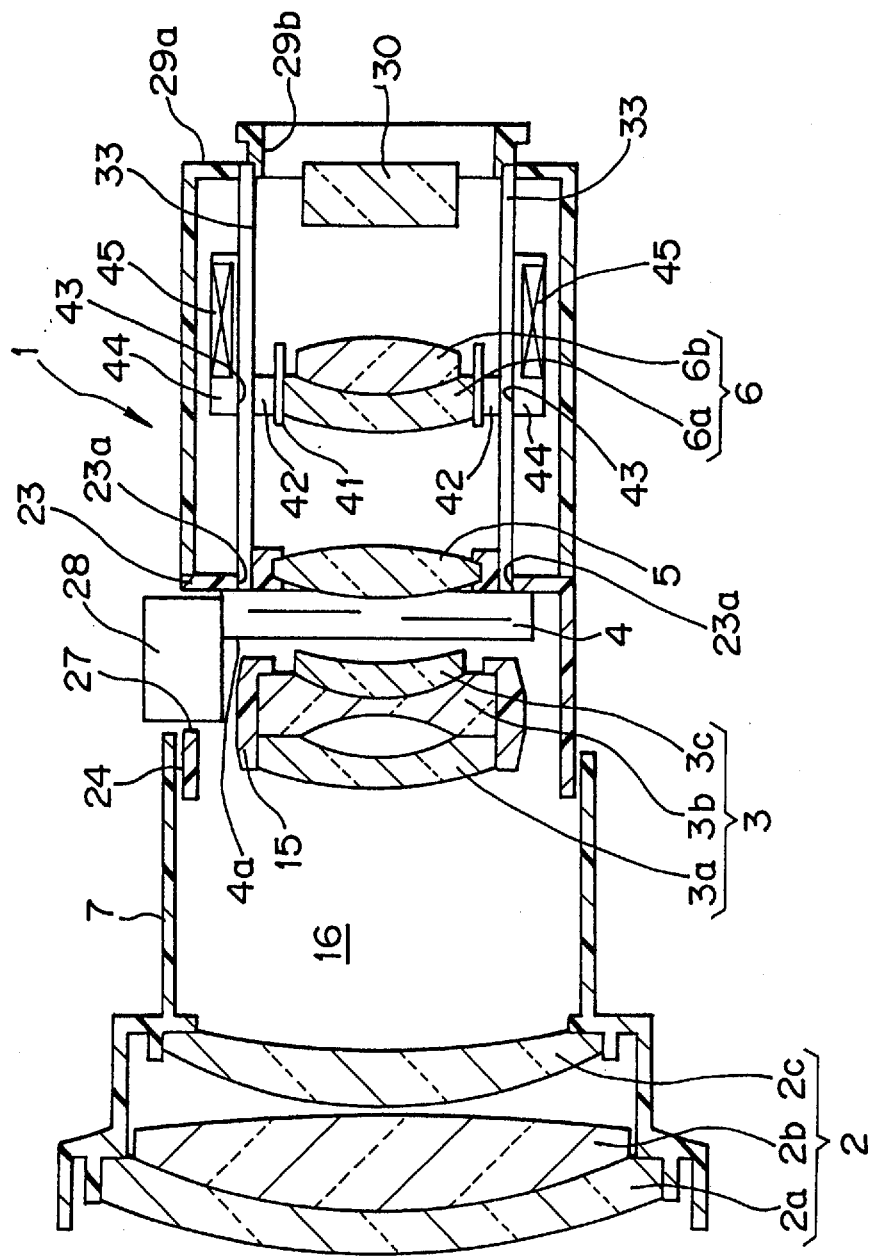
FIG. 12 is a sectional view taken along section line VIII—VIII in FIG. 8 showing the maximum telephoto ready-for-filming state.

As shown in FIG. 9, the first lens group 2 is made up of three lenses 2a, 2b and 2c; the lens 2a is a negative meniscus lens, the lens 2b is a convex lens and the lens 2c is a positive meniscus lens, and the first lens group 2 as a whole is a positive lens. The lenses 2a and 2b are affixed together and held in a front lens frame 7a of the movable barrel 7, and the lens 2c is held in a rear lens frame 7b positioned slightly behind the front lens frame 7a.

A segment-shaped cutaway 8 is formed in a lower-left portion of the lens 2c at the rear end of the first lens group 2, and as will be further discussed later this cutaway 8 prevents the front end of a movable lens linear motor which will be further discussed later from interfering with the lens 2c when the movable barrel 7 is retracted into the fixed barrel (see FIG. 13).

Figure 7:
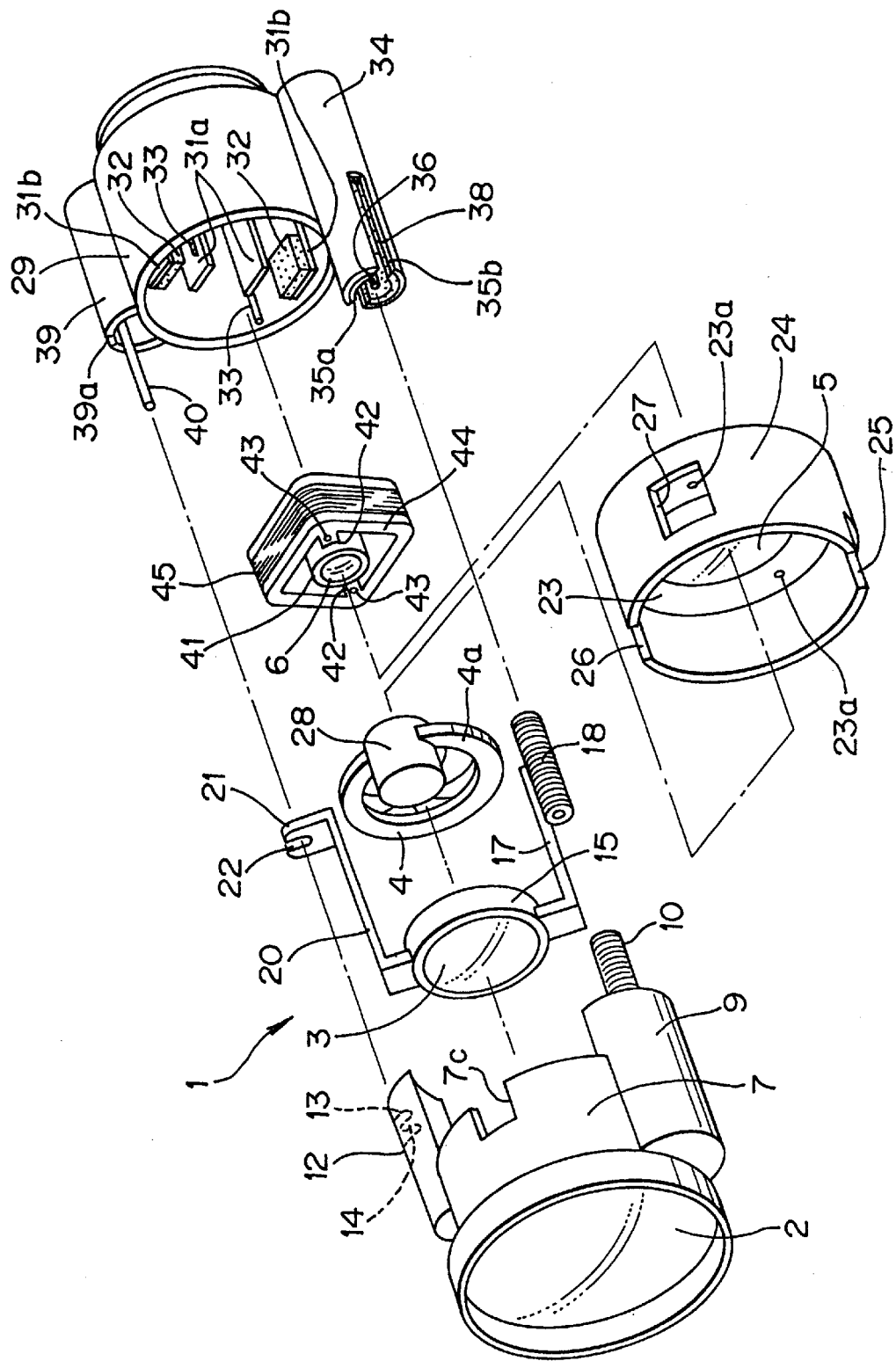
FIG. 7 is an exploded view of the same lens barrel.
Figure 8:
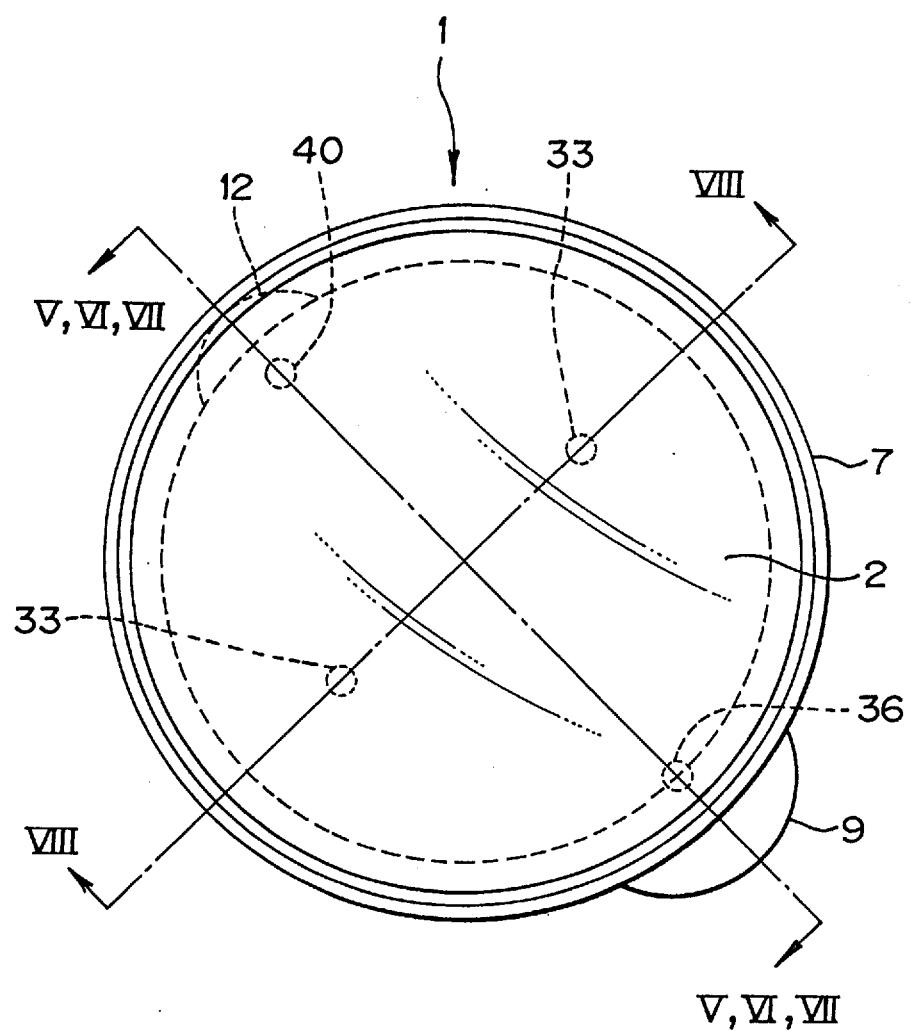
FIG. 8 is a front view of the same lens barrel.

As shown in FIG. 7, a rectangular cutaway 7c opening rearward is formed in an upper-right portion of the rear edge of the movable barrel 7, and as will be further discussed later this cutaway 7c prevents an iris mechanism 4 drive motor which will be further discussed later from interfering with the movable barrel 7 when the movable barrel 7 is retracted into the fixed barrel.

Figure 13:
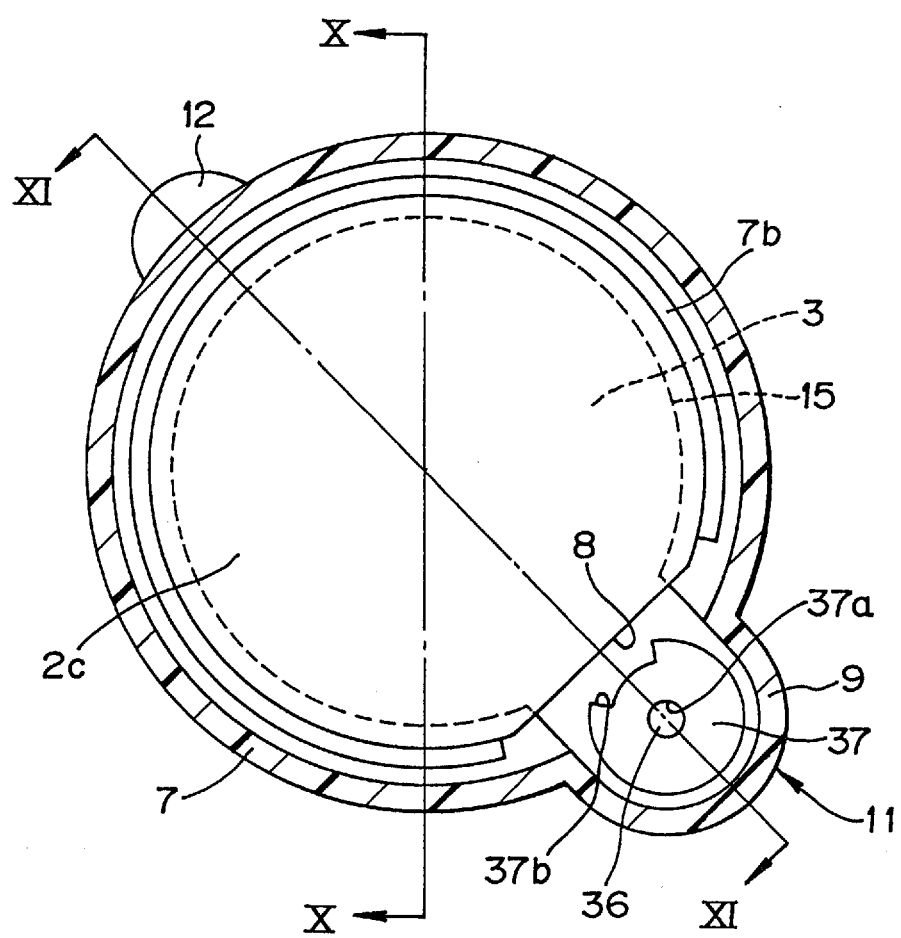
FIG. 13 is a sectional view taken along section line IX—IX in FIG. 10.
Figure 14:
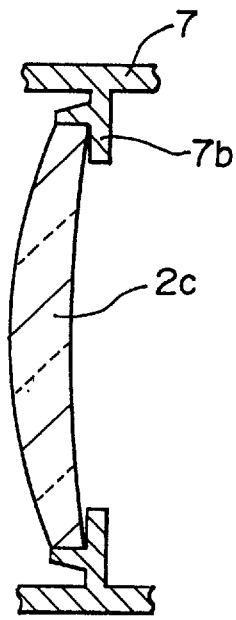
FIG. 14 is a sectional view taken along section line X—X in FIG. 13.

A lower projecting portion 9 projecting outward and rearward is formed on a lower-left portion of the outside of the movable barrel 7 in a position corresponding to the cutaway 8 of the lens 2c and is U-shaped in transverse cross-section (see FIG. 13).

As shown in FIG. 7, a cylindrical moving coil 10 is mounted in the rear end of the lower projecting portion 9 with its axial center extending into the lower projecting portion 9 in the front-rear direction. The moving coil 10 is part of a movable lens linear motor 11 for moving the movable barrel 7 in the front-rear direction with respect to the fixed barrel as will be further discussed later. The movable lens linear motor 11 will be further discussed later.

An upper projecting portion 12 projecting outward and rearward is formed on the outside of approximately the rear half of an upper-right portion of the movable barrel 7; the upper projecting portion 12 also is U-shaped in transverse cross-section, an engaging arm 13 projects inward from the rear end thereof, and a U-shaped cutaway 14 opening inward is formed in the engaging arm 13 (see FIG. 13).

As shown in FIG. 9, a lens holder 15 of the second lens group 3 is of such a size that it can be received into the movable barrel 7; the lens holder 15 is mounted movably with respect to the fixed barrel like the movable barrel 7 and is movable in a space 16 formed when the movable barrel 7 is projected from the fixed barrel.

The second lens group 3 is made up of three lenses 3a, 3b and 3c; the lens 3a is a negative meniscus lens, the lens 3b is a double-concave lens and the lens 3c is a positive lens, and as a whole the second lens group 3 is a negative lens. The second lens group 3 is held in the lens holder 15.

The second lens group 3 is movable during filming, being moved in the front-rear direction by movement of the lens holder 15, and constitutes a zoom lens for effecting zooming.

A coil support arm 17, L-shaped as seen from the side, is formed on a lower-left portion of the outside of the lens holder 15 with its longer arm extending rearward, and a cylindrical moving coil 18 having a central hole thereof extending in the front-rear direction is mounted on the outer surface of the rear end of the coil support arm 17. The moving coil 18 is part of a zooming lens linear motor 19 for moving the second lens group 3 in the front-rear direction as will be further discussed later . The zooming lens linear motor 19 will be further discussed later.

Figure 15:
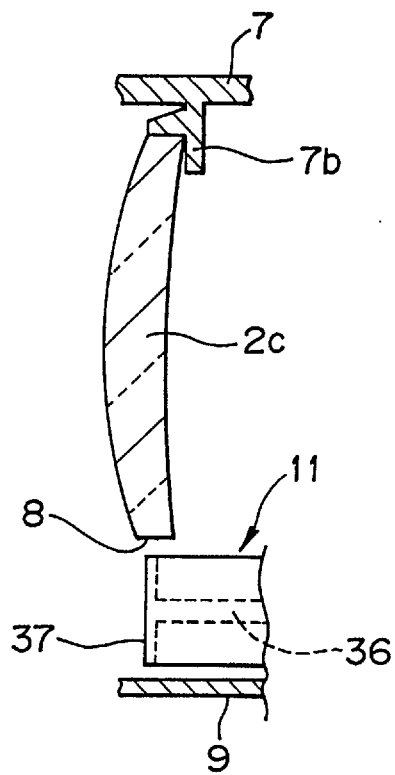
FIG. 15 is a sectional view taken along section line XI—XI in FIG. 13.
Figure 16:
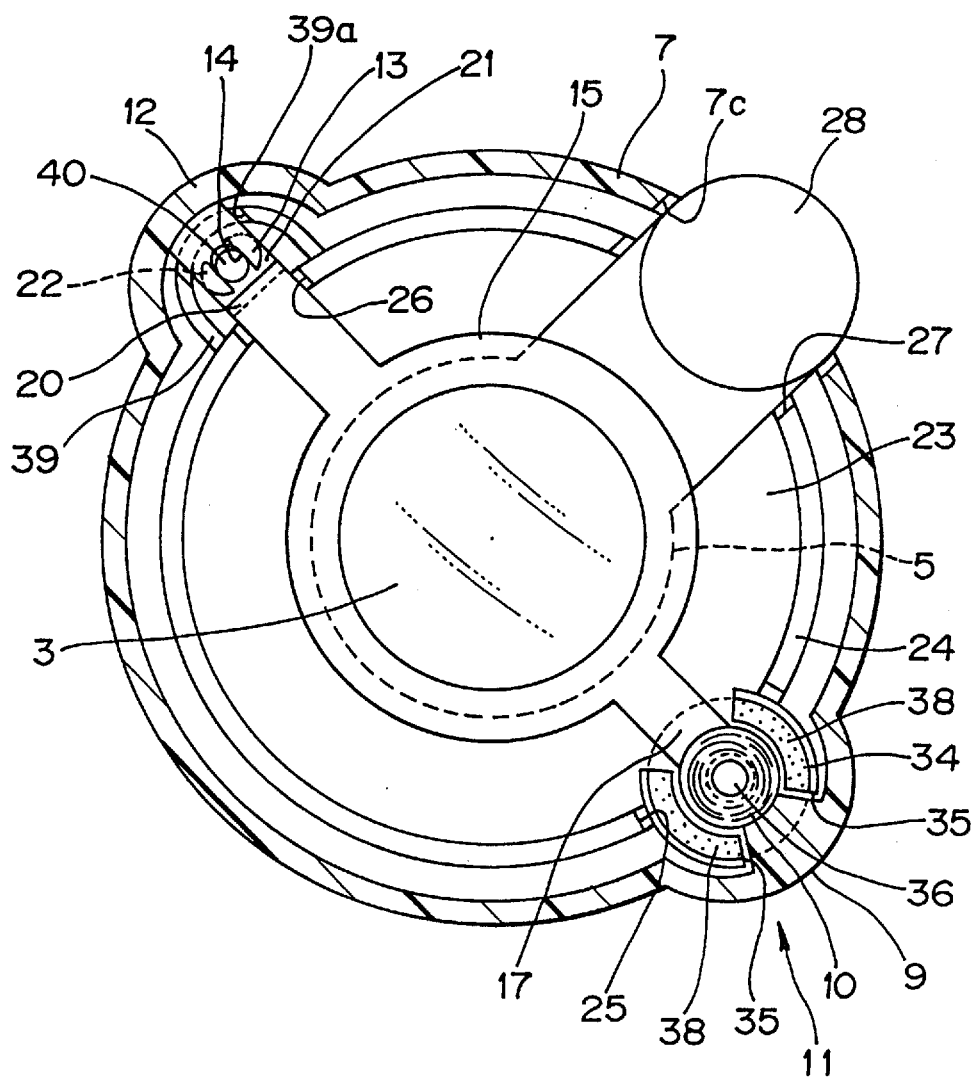
FIG. 16 is a sectional view taken along section line XII—XII in FIG. 10.
Figure 17:
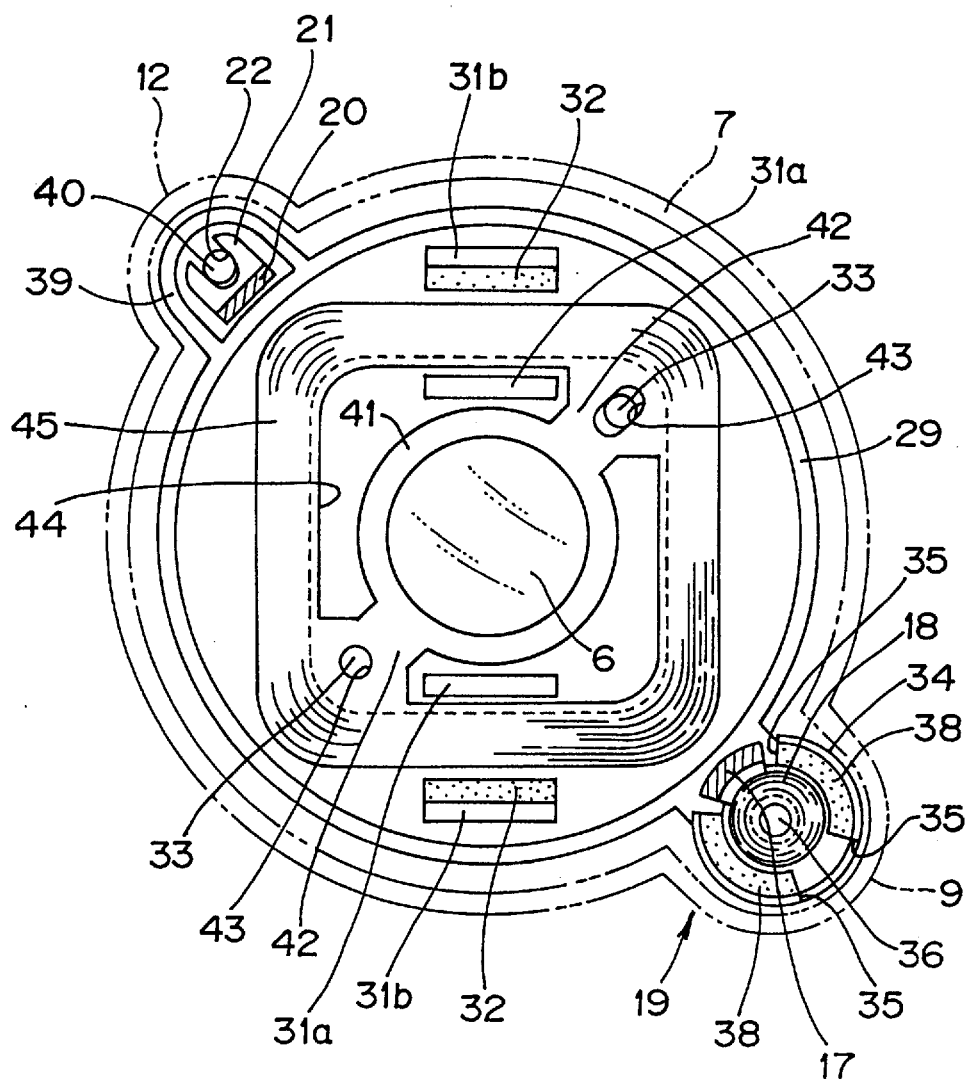
FIG. 17 is a sectional view taken along section line XIII—XIII in FIG. 10.

An engaging arm support arm 20, L-shaped as seen from the side, is formed on an upper-right portion of the outside of the lens holder 15 with its longer arm extending rearward, and an engaging arm 21 projects outward from the rear end of the engaging arm support arm 20 and a U-shaped cutaway 22 opening outward is formed in the engaging arm 21 (see FIG. 15).

A ring-shaped lens holder 23 of an external diameter slightly smaller than the internal diameter of the movable barrel 7 holds the third lens group 5 (see FIG. 9).

A substantially cylindrical frame 24 integrally projecting forward from the outer edge of the lens holder 23 is of an external diameter slightly smaller than the internal diameter of the movable barrel 7 and an internal diameter slightly larger than the external diameter of the lens holder 15; the front end of the frame 24 is open.

The third lens group 5 held in the lens holder 23 consists of one convex lens, and is a fixed lens for making substantially parallel a light beam having passed through the first lens group 2 and the second lens group 3.

A substantially rectangular lower cutaway 25 is formed in a lower-left portion of the front end edge of the frame 24 in a position corresponding to the position of the lower projecting portion 9 of the movable barrel 7; the lower cutaway 25 prevents the short arm of the coil support arm 17 of the lens holder 15 from interfering with the frame 24 when the lens holder 15 moves in the front-rear direction (see FIG. 7).

A substantially rectangular upper cutaway portion 26 is formed in an upper-right portion of the front end edge of the frame 24 in a position corresponding to the position of the upper projecting portion 12 of the movable barrel 7; the upper cutaway portion 26 prevents the short arm of the engaging arm support arm 20 of the lens holder 15 from interfering with the frame 24 when the lens holder 15 moves in the front-rear direction (see FIG. 7).

A rectangular hole 27 is formed in an upper-left portion of the rear end of the frame 24 and is for a drive motor 28 of the iris mechanism 4 to be disposed in.

The iris mechanism 4 has a plurality of diaphragm vanes in a central hole of a flat, doughnut-shaped case 4a, and the diaphragm vanes are opened and closed by the drive motor 28 which is mounted on the case 4a; the iris mechanism 4 is so disposed that its drive motor 28 is positioned in the rectangular hole 27 of the frame 24 and the case 4a is positioned slightly in front of the lens holder 23 inside the frame 24.

When the movable barrel 7, the lens holder 15 of the zoom lens 3, the lens holder 23 and the frame 24 are so disposed that the optical axes of the first lens group 2, the zoom lens 3 and the third lens group 5 are aligned, as seen from the front the axial center of the moving coil 10 of the movable barrel 7 and the axial center of the moving coil 18 of the lens holder 15 of the zoom lens 3 are aligned; also, the cutaway 14 of the engaging arm 13 of the movable barrel 7 and the cutaway 22 of the engaging arm 21 of the lens holder 15 overlap with their opening directions opposing.

As shown in FIG. 9, a substantially cylindrical fixed barrel 29 of which the rear end is closed off has a rectangular opening 29b formed in its rear wall 29a; a filter 30 (having predetermined transmission characteristics) is mounted in the rectangular opening 29b, and yokes 31, 31 bent into U-shapes as seen from the side are mounted on the inner side of the rear wall 29a of the fixed barrel 29 in upper and lower parts of the inside of the fixed barrel 29 in positions above and below the opening 29b in the rear wall 29a.

The arms of the yokes 31, 31 positioned nearer to the axial center of the lens barrel 1 are inner yoke arms 31a, 31a and the outer arms are outer yoke arms 31b, 31b; magnets 32, 32 are affixed to the surfaces of the outer yoke arms 31b, 31b which face the inner yoke arms 31a, 31a, and a magnetic fields are thereby created between the inner yoke arms 31a, 31a and the magnets 32, 32.

Guide shafts 33, 33 for supporting the fourth lens group 6 slidably in the optical axis direction project from the upper-left corner and the lower-right corner of the rear wall 29a of the fixed barrel 29. When the lens holder 23 is assembled to the fixed barrel 29, the front ends of the guide shafts 33, 33 are supported by guide shaft supporting holes 23a, 23a formed in the lens holder 23.

A cylindrical yoke 34 long in the front-rear direction of which the rear end is closed off and the front end is open is mounted on the outer surface of a lower-left portion of the fixed barrel 29 with its axial center parallel with the axial center of the fixed barrel 29; the rear ⅔ of the cylindrical yoke 34 is attached to the fixed barrel 29 and the front ⅓ projects beyond the front end of the fixed barrel 29.

Slits 35a, 35b opening to the lower-left and to the upper-right and extending parallel to the axial center of the cylindrical yoke 34 are formed in the sides of the cylindrical yoke 34 from the middle of the cylindrical yoke 34 to the front end of the same and their front ends are open at the front end of the same.

A bar-like guide shaft 36 made of a material having good magnetic permeability is disposed inside the cylindrical yoke 34 with its center aligned with the axial center of the cylindrical yoke 34.

Magnets 38, 38 arcuate in transverse cross-section are affixed to the inner circumferential surface of the cylindrical yoke 34 avoiding the slits 35a, 35b, and a magnetic field is thereby formed between the magnets 38, 38 and the guide shaft 36.

A disc-shaped closing-off plate 37 made of a material having good magnetic permeability has a center hole 37a formed in the center thereof and is so disposed that it covers the opening at the front end of the cylindrical yoke 34 and the front end of the guide shaft 36 press-fits into the center hole 37a; as a result, the cylindrical yoke 34 and the guide shaft 36 are magnetically linked, and when magnetic paths are formed as will be further discussed later a magnetic path passing from the magnets 38, 38 via the cylindrical yoke 34 through the rear end wall of the cylindrical yoke 34 and a magnetic path passing through the closing-off plate 37 are formed.

A fan-shaped cutaway 37b is formed in a position on the upper left of the closing-off plate 37 corresponding to the slit 35a formed on the fixed barrel 29 side of the cylindrical yoke 34, and this prevents the closing-off plate 37 from obstructing movement of the coil support arm 17 of the lens holder 15 of the zoom lens 3.

When the moving coil 18 of the lens holder 15 and the moving coil 10 of the movable barrel 7 are fitted onto the guide shaft 36, a magnetic path passing around the magnets 38, 38—the cylindrical yoke 34—(the closing-off plate 37)—the guide shaft 36—the magnets 38, 38 is formed and the movable lens linear motor 11 and the zooming lens linear motor 19 are thereby constructed.

A tubular upper projecting portion 39 is integrally formed projecting outward from an upper-right portion of the fixed barrel 29; the upper projecting portion 39 has its axial center extending in the front-rear direction and is formed along substantially the whole length of the fixed barrel 29.

A slit 39a is formed in an upper-right portion of the upper projecting portion 39 and extends parallel with the axial center of the cylindrical yoke 34; the slit 39a is formed in a position corresponding to the engaging arm 13 of the upper projecting portion 12 of the movable barrel 7, and prevents the engaging arm 13 from interfering with the upper projecting portion 39 of the fixed barrel 29 when the movable barrel 7 moves in the front-rear direction.

A rotation-stopping shaft 40 is disposed approximately on the axial center of the upper projecting portion 39, projecting forward from the rear end wall of the upper projecting portion 39; the front end of the rotation-stopping shaft 40 projects forward beyond the front end of the fixed barrel 29, and the length of the rotation-stopping shaft 40 is substantially the same as that of the cylindrical yoke 34.

The cutaway 22 of the engaging arm 21 of the lens holder 15 and the cutaway 14 of the engaging arm 13 of the movable barrel 7 slidably engage with the rotation-stopping shaft 40, and as a result the lens holder 15 and the movable barrel 7 are prevented from rotating about the guide shaft 36.

A substantially cylindrical lens holding member 41 for holding the fourth lens group 6 has supported arms 42, 42 extending radially outward from an upper-left portion and a lower-right portion thereof.

The fourth lens group 6 is made up of two lenses 6a, 6b; the lens 6a is a negative meniscus lens and the lens 6b is a double-convex lens, and the fourth lens group 6 as a whole is a positive lens. The fourth lens group 6 is held in the lens holding member 41.

The fourth lens group 6 is movable during filming, being moved in the front-rear direction by movement of the lens holding member 41, and mainly serves as a focusing lens for effecting focusing. The focusing lens 6 also supplements the above-mentioned variable power lenses.

Guide holes 43, 43 are formed in the supported arms 42, 42 of the lens holding member 41 in positions corresponding to the guide shafts 33, 33; one of the guide holes 43, 43 is substantially the same size as or slightly larger than the respective guide shaft 33, and the other guide hole 43 is in transverse cross-section a long hole the shorter diameter of which is substantially the same size as or slightly larger than the respective guide shaft 33.

A rectangular, tube-like coil bobbin 44 is formed around the lens holding member 41 integrally with the supported arms 42, 42; the coil bobbin 44 is slightly smaller in cross-section than the fixed barrel 29 and has a movable coil 45 is wound thereon.

The vertical direction external dimension of the coil bobbin 44 with the movable coil 45 wound thereon is smaller than the gap between the magnets 32, 32 mounted on the two yokes 31, 31 of the fixed barrel 29, and the vertical direction internal dimension of the coil bobbin 44 is larger than the gap between the surfaces of the inner yoke arms 31a, 31a which face the respective magnets 32, 32.

The parts described above are assembled in the following way to form the lens barrel 1.

First, the guide holes 43, 43 in the lens holding member 41 of the fourth lens group 6 are fitted over the guide shafts 33, 33 of the fixed barrel 29 and the lens holding member 41 is thereby slidably mounted on the fixed barrel 29.

At this time, when the lens holding member 41 has been mounted on the guide shafts 33, 33, the upper and lower sides of the coil bobbin 44 and the movable coil 45 are positioned in the magnetic fields of the respective yokes 31, 31 of the fixed barrel 29 without making contact with the yokes 31, 31, and a magnetic path around the magnets 32, 32—the outer yoke arms 31b, 31b—the inner yoke arms 31a, 31a—the magnets 32, 32 is formed.

As a result, when a current is passed through the movable coil 45, because the cylindrical yoke 34 is subjected to a motive force acting in the front-rear direction, the lens holding member 41 moves in the front-rear direction guided by the guide shafts 33, 33 and the fourth lens group 6 moves in the front-rear direction, i.e. in the optical axis direction of the lenses, and focusing is thereby effected.

The lens holder 23 in which the third lens group 5 is mounted is disposed covering the front end opening of the fixed barrel 29 and so that the optical axis of the third lens group 5 and the optical axis of the fourth lens group 6 are aligned.

The lens holder 15 holding the zoom lens 3 is so fitted that the moving coil 18 thereof fits loosely inside the cylindrical yoke 34 and fits slidably over the guide shaft 36 and the cutaway 22 in the engaging arm 21 engages slidably with the rotation-stopping shaft 40 of the fixed barrel 29. In this state, the optical axis of the zoom lens 3 is aligned with the optical axes of the third lens group 5 and the fourth lens group 6 and the lens holder 15 is mounted slidably in the optical axis direction.

As a result, the moving coil 18 is positioned in the magnetic field formed between the guide shaft 36 and the magnets 38, 38 and forms part of the zooming lens linear motor 19; also, the engagement of the cutaway 22 with the rotation-stopping shaft 40 prevents the lens holder 15 rotating about the guide shaft 36, and the optical axis of the zoom lens 3 does not move out of alignment with the optical axes of the third lens group 5 and the fourth lens group 6.

When a current is passed through the moving coil 18, because the moving coil 18 is subjected to a motive force acting in the front-rear direction, the lens holder 15 moves in the front-rear direction guided by the guide shaft 36 and the zoom lens 3 is thereby moved in the front-rear direction, i.e. the direction of the optical axis of the lens array, and zooming is effected.

After the lens holder 15 is mounted on the fixed barrel 29, the moving coil 10 of the movable barrel 7 is fitted loosely inside the cylindrical yoke 34 and fitted slidably over the guide shaft 36; also, the cutaway 14 of the engaging arm 13 slidably engages with the rotation-stopping shaft 40 of the fixed barrel 29. In this state, the optical axis of the first lens group 2 of the movable barrel 7 is aligned with the optical axes of the zoom lens 3, the third lens group 5 and the fourth lens group 6, and the movable barrel 7 is mounted slidably in the optical axis direction.

As a result, the moving coil 10 is positioned in the magnetic field formed between the guide shaft 36 and the magnets 38, 38 and forms part of the movable lens linear motor 11; also, the engagement of the cutaway 14 with the rotation-stopping shaft 40 prevents the movable barrel 7 from rotating about the guide shaft 36 and the optical axis of the first lens group 2 does not move out of alignment with the optical axes of the zoom lens 3, the third lens group 5 and the fourth lens group 6.

When a current is passed through the moving coil 10, because the moving coil 10 is subjected to a motive force acting in the front-rear direction, the movable barrel 7 moves in the front-rear direction guided by the guide shaft 36 and the movable barrel 7 is thereby moved between a state wherein it is positioned on the fixed barrel 29 side (the retracted state) and a state wherein it has been protruded forward from this state and filming is possible (the ready-for-filming state).

When the movable barrel 7 is retracted into the fixed barrel 29, the zoom lens 3 is positioned in the position in its range of movement furthest on the fixed barrel 29 side and forward movement thereof is obstructed.

Also, in this state, because the front end portion of the movable lens linear motor 11, that is, the closing-off plate 37 and the front ends of the cylindrical yoke 34, the magnets 38, 38 and the guide shaft 36, is positioned in the cutaway 8 of the lens 2c at the rear end of the first lens group 2, they do not interfere with the lens 2c; therefore, the extent of the retraction can be made greater than if there were no cutaway 8.

When on the other hand the movable barrel 7 is protruded from the fixed barrel 29 into the filming state, the space 16 is formed between the movable barrel 7 and the fixed barrel 29, and the zoom lens 3 can move in the space 16.

Also, in this state, although the rear end edge of the movable barrel 7 is positioned in front of the lens holder 23 of the third lens group 5, because the frame 24 projecting forward is formed integrally with the lens holder 23, the rear end portion of the movable barrel 7 remains fitted over the frame 24 and as a result dust and the like is prevented from entering between these parts.

After the movable barrel 7 is moved into its filming state, a drive current is supplied to the moving coil 18 of the zooming lens linear motor 19, the zoom lens 3 is moved and zooming is thereby carried out as necessary, and a drive current is supplied to the cylindrical yoke 34, the fourth lens group 6 is moved and focusing is thereby carried out as necessary.

In a lens barrel according to this preferred embodiment, because a space formed when a movable lens barrel is protruded from a fixed barrel and/or camera body is used as a space for a movable lens of a variable power system and/or a focusing system to be movable in, it is not necessary to provide a space in which the movable lens can move which remains when the movable barrel is retracted, the fixed barrel or camera body is not made unnecessarily large in the optical axis direction and a contribution to downsizing of the whole camera is achieved.

Although in the preferred embodiment described above a lens barrel of the invention was applied to a lens barrel of a video camera, the invention is not limited to this and can also be applied to a lens barrel of a still camera; also, although a retractable lens barrel wherein a movable lens is retractable into a fixed barrel was described, the invention can also be applied to a retractable lens barrel wherein a movable barrel is retractable into a camera body.

In the preferred embodiment described above the driving means were liner motors, but the driving means of movable parts of a lens barrel of the invention may alternatively be for example driving means based on a combination of a feed screw and a nut.

(2) Second Preferred Embodiment

FIG. 18 through FIG. 21 show a lens barrel according to a second preferred embodiment of the invention.

Reference numeral 100 denotes a lens barrel for a camera.

Figure 18:
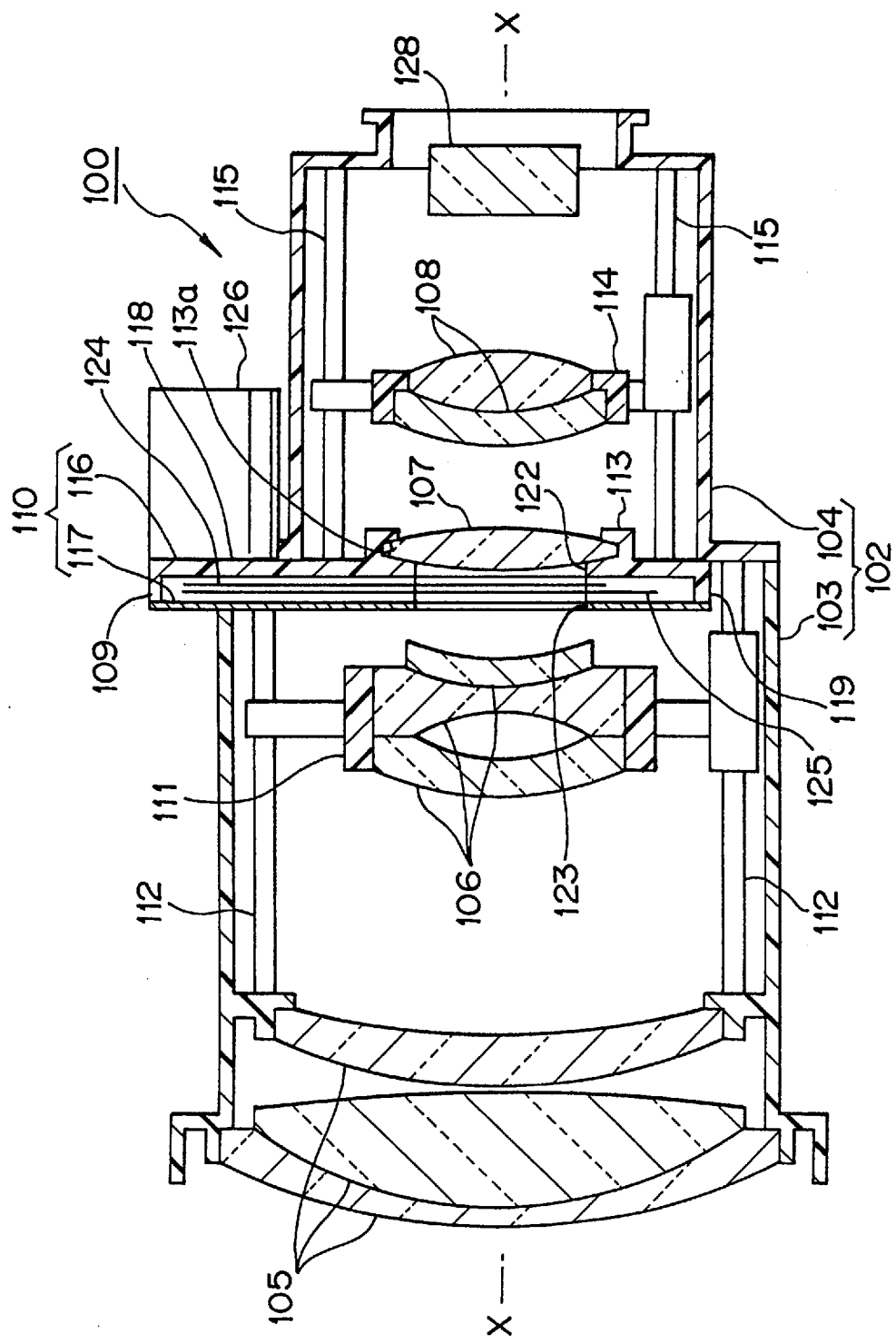
FIG. 18 is a vertical sectional overall view of a lens barrel according to a second preferred embodiment of the invention.

A case 102 of the camera lens barrel 100 is made up of a cylindrical front half 103 and a cylindrical rear half 104 of slightly smaller diameter and length than the front half 103 joined together one in front of the other (in FIG. 18 the left side will be taken as the front and the right side as the rear).

A first lens group 105 is a positive lens group, a second lens group 106 is a negative lens group, a third lens group 107 is a positive lens group and a fourth lens group 108 is also a positive lens group.

The four lens groups 105, 106, 107 and 108 are arrayed in the above order on a common optical axis X—X extending in the front-rear direction through the center of the case 102 as seen in the front-rear direction.

A casing 110 of an iris unit 109 is mounted interposed between the front half 103 and the rear half 104 between the second lens group 106 and the third lens group 107.

The first lens group 105 is fixed to the front end of the front half 103 of the case 102, and the front of the case 102 is thereby closed off.

A sliding lens holder 111 is slidably mounted on slide shafts 112, 112m mounted on the upper and lower sides of the front half 103 of the case 102, and the second lens group 106 is mounted in the slidable lens holder 111 and constitutes a zooming lens.

A ring-shaped fixed lens holder 113 for holding the third lens group 107 on the iris unit 109 is formed projecting rearward on the rear surface of the casing 110 of the iris unit 109 and has a fitting groove 113a for holding the third lens group 107 formed in its inner circumferential surface.

A sliding lens holder 114 is slidably mounted on slide shafts 115, 115 mounted on the upper and lower sides of the rear half 104 of the case 102, and the fourth lens group 108 is mounted in the sliding lens holder 114 and constitutes a focusing lens.

The casing 110 of the iris unit 109 is made up of a flat dish shaped main part 116 whose front side is concave and a cover plate 117 closing off the front side of the main part 116.

The main part 116 consists of a vertically-long rectangular flat plate-shaped rear wall 118, a peripheral wall 119 projecting forward from the edge of the rear wall 18 and small support pins 120, 120 and 121, 121 projecting forward from left and right side portions of the front surface of the rear wall 118 integrally formed out of synthetic resin, and a circular light passage hole 122 is formed in the rear wall 118 slightly below the center thereof.

The cover plate 117 is a flat plate of the same shape as the shape of the main part 116 as seen in the front-rear direction and is attached to the main part 116 and closes off the front thereof; engaging arms 117a, 117a formed on the cover plate 117 engage with engaging projections 119a, 119a projecting outward from the peripheral wall 119 of the main part 116, whereby the cover plate 117 and the main part 116 are held together to form a thin box-shaped casing 110.

A light passage hole 123 is formed in the cover plate 117 in a position facing the light passage hole 122 in the main part 116.

Diaphragm vanes 124 and 125 are made of a strong resin film or the like.

The diaphragm vane 124 has a substantially semicircular large cutaway 124a open at its lower edge, two slits 124b, 124b formed extending vertically near the upper and lower ends of its left side and an engaging long hole 124c long in the left-right direction formed at its upper end, and by the two support pins 120, 120 on the left side of the casing 110 slidably engaging with the slits 124b, 124b the diaphragm vane 124 is mounted on the casing 110 slidably in the vertical direction.

The other diaphragm vane 125 is substantially J-shaped and has a substantially semicircular large cutaway 125a formed in the upper edge of its lower portion, slits 125b, 125b formed extending vertically near the upper and lower ends of its right side and an engaging long hole 125c long in the left-right direction formed at its upper end, and by the two support pins 121, 121 on the right side of the casing 110 slidably engaging with the slits 125b, 125b the diaphragm vane 125 is mounted on the casing 110 slidably in the vertical direction.

A motor 126 is mounted on the rear side of the upper portion of the casing 110, and a rotating shaft 126a of the motor 126 passes through the rear wall 18 and into the casing 110.

A pivot arm 127 is attached by its central portion to the rotating shaft 126a of the motor 126. Small engaging pins 127a, 127a project forward from the ends of the pivot arm 127, and these engaging pins 127a, 127a respectively slidably engage with the long engaging holes 124c and 125c formed in the two diaphragm vanes 124 and 125.

As a result, when the pivot arm 127 pivots, because the two engaging pins 127a, 127a move in mutually opposite vertical directions, the diaphragm vanes 124 and 125 move in mutually opposite vertical directions.

The third lens group 107 is fitted into the fitting groove 113a in the fixed lens holder 113 formed projecting from the rear surface of the casing 110 and fixed behind the light passage hole 122 in the rear wall 118 of the casing 110.

A filter 128 having predetermined transmission characteristics is fixed behind the fourth lens group 108, which constitutes a focusing lens.

Figure 19:
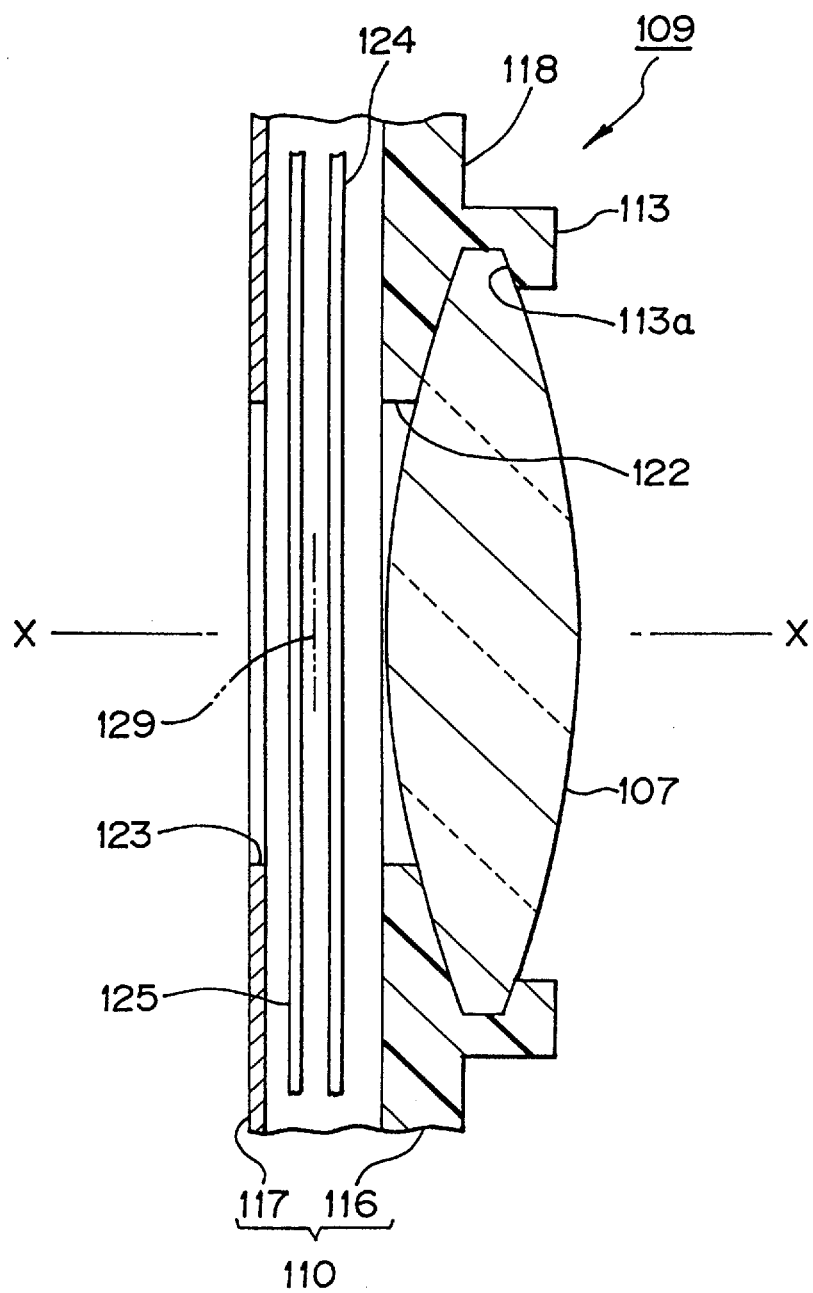
FIG. 19 is an enlarged sectional detail view of the same lens barrel.
Figure 20:
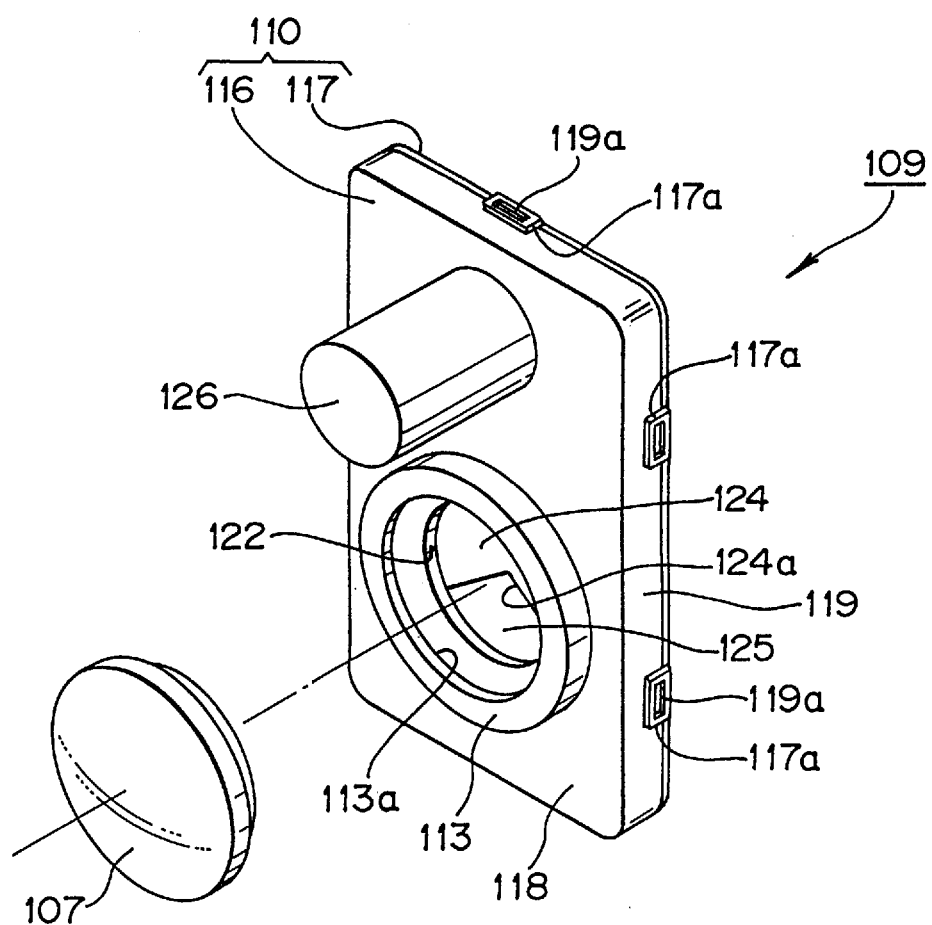
FIG. 20 is an exploded perspective view showing a third lens group removed from an iris unit.
Figure 21:
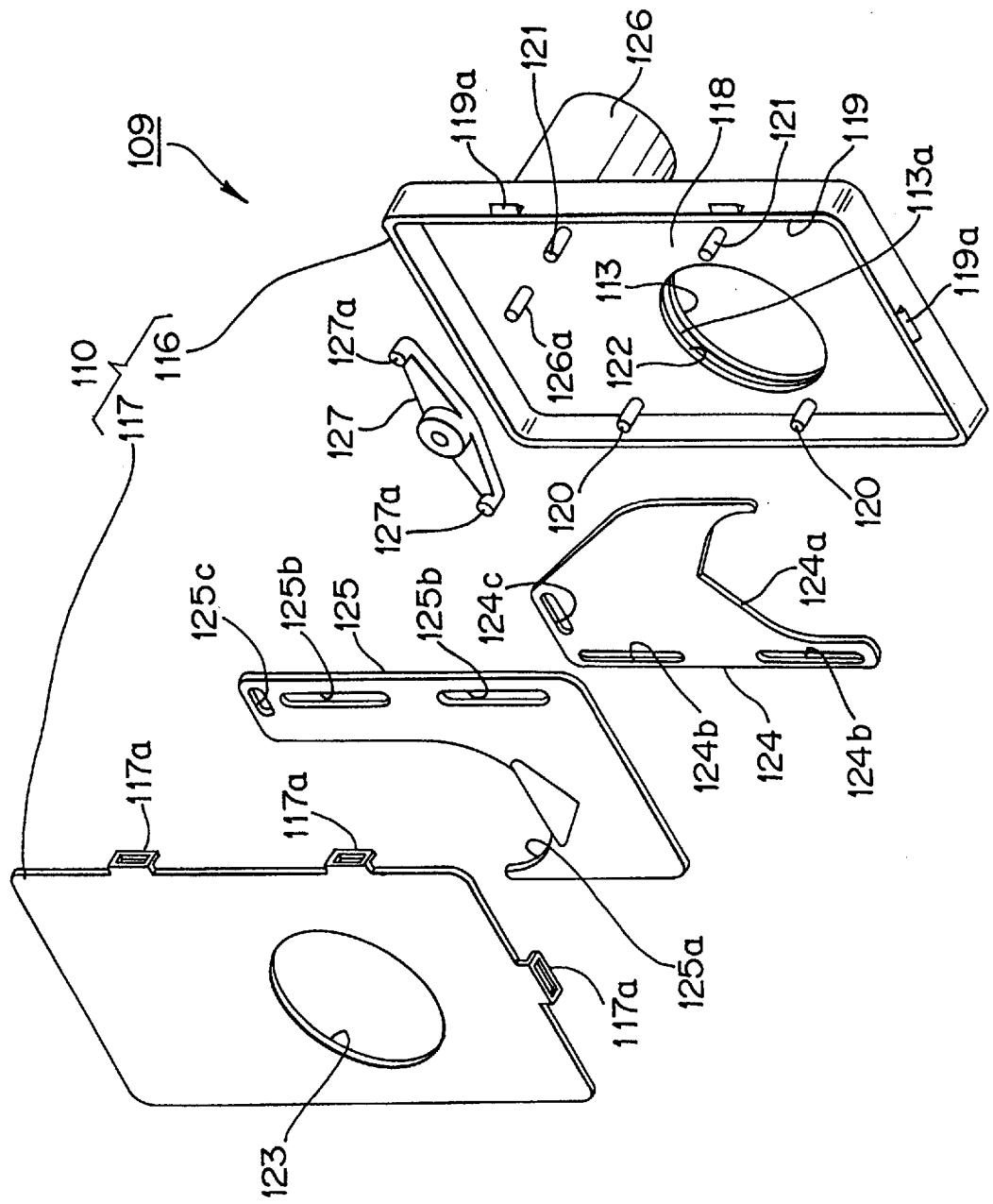
FIG. 21 is an exploded perspective view of the iris unit.

The double-dot broken line 129 in FIG. 19 indicates the diaphragm central position of the diaphragm vanes 124 and 125, and this line serves as a reference for setting the distance between the diaphragm vanes 124 and 125 and the third lens group 107.

In the camera lens barrel 101 described above, because the fixed lens holder 113 is not among the parts constituting the case 102, compared with a lens barrel wherein the fixed lens holder is one of the parts constituting the case as in conventional camera lens barrels, the number of parts making up the case is reduced and optical axis misalignment arising during assembly of the case occurs less readily.

Because the casing 110 of the iris unit 109 and the fixed lens holder 113 are formed integrally, the optical axis X—X of the light passage hole 122 formed in the casing 110 and the optical axis X—X of the third lens group 107 can be aligned just by fitting the third lens group 107 into the fitting groove 113a in the fixed lens holder 113, and the distance from the diaphragm central position 129 of the diaphragm vanes 124 and 125 inside the casing 110 to the third lens group 107 can be set accurately.

With a camera lens barrel according to the invention, the length of the lens barrel in the front-rear direction can be made short, the number of parts can be reduced and the optical axes of lens groups and an iris unit can be easily aligned. Also, the distance between the diaphragm central position of the iris unit and the third lens group can be set easily.

What is claimed is:

1. A retractable lens barrel arrangement comprising:

a fixed structure;

a movable lens barrel reciprocatively supported on said fixed structure;

a lens system including a first lens group disposed in an end of said barrel;

a first linear motor disposed in said fixed structure for moving said movable barrel toward and away from said fixed structure; and a sector-shaped cutaway portion formed in an inboard lens of said first lens group for permitting said movable barrel to be retracted with respect to said fixed structure without interference between the inboard lens and said first linear motor.

2. A retractable lens barrel arrangement as set forth in claim 1, wherein said lens system further comprises second, third and fourth lens groups which are housed in the lens barrel in addition to the first lens group, the first, second, third and fourth lens groups being arrayed in the following order from an object side: a positive lens group, a negative lens group, a positive lens group, a positive lens group.

3. A lens barrel arrangement as set forth in claim 2, wherein the second lens group comprises a variable power system movable lens group and wherein the fourth lens group comprises a focusing system movable lens group.

4. A lens barrel arrangement as set forth in claim 3, further comprising a second linear motor, said second linear motor being operatively connected with the variable power system movable lens.

5. A lens barrel arrangement as set forth in claim 2, further comprising an iris mechanism, said iris mechanism being operatively interposed between the second and third lens groups, said iris mechanism being disposed on a frame which is supported by said fixed structure and which supports the third lens group.

6. A lens barrel arrangement as set forth in claim 2, wherein said iris mechanism includes a motor.

7. A lens barrel arrangement as set forth in claim 6, wherein the frame in which the iris mechanism is disposed is formed with an opening through which the motor extends.

8. A lens barrel arrangement as set forth in claim 7, wherein the movable lens barrel is formed with a cut-out for receiving a portion of the iris motor which projects out through the opening in the frame when the movable lens barrel is retracted toward the fixed structure.

9. A lens barrel for a camera comprising:

a fixed structure;

a movable barrel telescopically disposed with said fixed structure so as to create a space within the lens barrel when the movable barrel is protruded with respect to said fixed structure;

movable lens means operatively connected with a lens drive means for movement into the space created by the protruding structure; and casing means for housing an iris mechanism and for supporting a fixed lens, wherein said casing means comprises a cylindrical frame in which the iris mechanism is enclosed, said cylindrical frame being apertured to allow a motor, which drives the iris mechanism to project, at least in part, out of the cylindrical frame.

10. A lens barrel according to claim 9, wherein the drive means includes a linear motor which is disposed in the fixed barrel and which extends in a direction parallel to an optical axis of the lens barrel, and wherein a first group of lenses are arranged at an outboard end of the movable barrel, at least one of said first group of lenses having a cut-away portion which permits the movable barrel to be retracted, with respect to said fixed structure, to a position wherein an end portion of the linear motor is received, at least in part, in the cut-away portion.

* * * * *